Sept. 2, 1930.  R. J. SHEEHAN  1,774,530
PIPE CLAMP
Filed Sept. 24, 1928

INVENTOR.
Raymond J. Sheehan
BY
ATTORNEY

Patented Sept. 2, 1930

1,774,530

UNITED STATES PATENT OFFICE

RAYMOND J. SHEEHAN, OF TULSA, OKLAHOMA

PIPE CLAMP

Application filed September 24, 1928. Serial No. 308,122.

My invention relates to clamps and more particularly to a device of this character for use with pipes or other cylindrical objects, the principal purpose of the present invention being to provide a clamp for rigidly holding abutting ends of pipe sections in juxtaposition and aligning relation while being welded together.

A further object of my invention is to provide a clamp embodying a maximum amount of strength with a minimum amount of weight so that it may be readily applied and moved from one point of operation to another.

In accomplishing these and other objects of my invention I have provided improved details of structure, the preferred forms of which are illustrated in the accompanying drawings, wherein.

Figure 1:
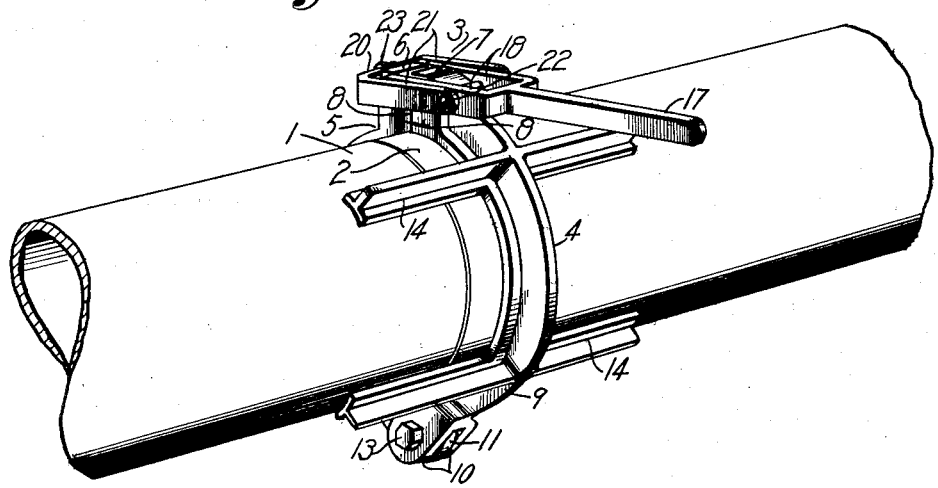
Fig. 1 is a perspective view of a clamp embodying my invention applied to abutting ends of pipe sections in position for welding.
Figure 2:
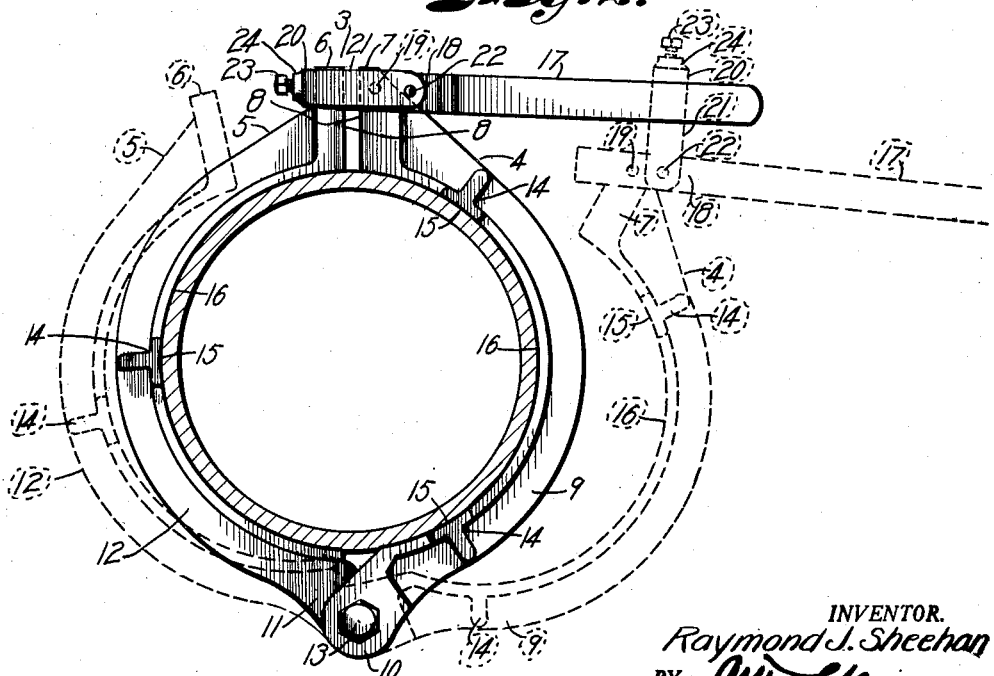
Fig. 2 is a cross-sectional view of a pipe illustrating the clamp applied thereto in locked position, the dotted outline indicating unlocked position of the clamp.

Referring more in detail to the drawings:

1 and 2 designate abutting ends of pipe sections and 3 a clamp comprising complementary arcuate jaws 4 and 5, terminating at their upper free ends in spaced upstanding ears 6 and 7 respectively, having opposing flat faces 8. A radial reinforcing flange 9 on the jaw 4 terminates at its lower end in a pair of spaced ears 10 for receiving therebetween an ear 11 integral with a reinforcing flange 12 on the jaw 5, the ears 10 and 11 being hingedly connected by a bolt 13.

Integral with the jaws and their respective reinforcing flanges are laterally projecting fingers 14 extending to either side of the jaws, a pair of fingers being preferably provided on the jaw 4 and a single finger on the jaw 5 so that with the clamp in functional position the three fingers will be spaced equally relative to the circumference of the pipe and will extend in parallel alignment with the pipe.

The inner faces 15 of the fingers are in the same arcuate plane with the inner walls 16 of the jaws 4 and 5 and with the outer surfaces of the pipe sections.

Means for clamping the free ends of the jaws together include a lever 17, having spaced arms 18 engaging the ear 7 of the jaw 4 and pivotally mounted thereon by a pin 19. A hook 20 cooperating with the lever is provided with spaced arms 21 for receiving therebetween the arms 18, a pin 22 extending through the arms to the rear of the pin 19 for hingedly connecting the hook and the lever. An adjustable screw 23 in the portion 24 of the hook engaging the ear 6 of the jaw 5, provides for adjustment of the space between the faces 8 thereby adapting the clamp for use with larger or smaller pipes.

A clamp such as described may be used in the process for welding pipe ends together as follows:

The jaws of the clamp are laid in open position on the ground. The end of one pipe section is placed on the jaws extending slightly beyond the center of the jaws. The other pipe section is placed on the jaws, with its end adjacent that of the first named pipe and the jaws are closed. With the lever 17 in raised position the hook 20 is engaged over the ear 6. The lever is then swung downwardly, on the pivot pin for clamping the jaws firmly on the pipe sections and holding the sections in axial alignment for the welding operation. Sufficient portions of the pipe ends are welded to rigidly connect them and the clamp removed to permit welding of the remainder of the seam.

What I claim and desire to secure by Letters Patent is:

1. In a pipe clamp, a pair of complementary semicircular jaws, means on one end of each jaw for hingedly connecting the jaws together, a lever pivotally mounted on the opposite end of one jaw, an ear on the opposite end of the other jaw, a hook pivotally connected to said lever, and adjustable means on the hook engageable with said ear upon operation of the lever to move the jaws into pipe-clamping position.

2. In a pipe clamp, a pair of complementary semicircular jaws, means on one end of each jaw for hingedly connecting the jaws together, spaced lateral fingers projecting from the jaws and having inner faces adapted to engage the outer walls of pipe sections, a lever pivotally mounted on the opposite end of one jaw, an ear on the opposite end of the other jaw, a hook pivotally connected to said lever, means on the hook adjustable to sizes of pipe and engageable with said ear for urging the fingers into clamping engagement with the pipe sections.

3. In a pipe clamp, a pair of complementary semicircular jaws, means on one end of each jaw for hingedly connecting the jaws together, a lever pivotally mounted on the opposite end of one jaw, an ear on the opposite end of the other jaw, a hook pivotally connected with said lever, and adjustable means between said hook and ear to adapt the clamp for various sizes of pipes.

In testimony whereof I affix my signature.

RAYMOND J. SHEEHAN.